US006446088B1

United States Patent
Vaduvur et al.

(10) Patent No.: US 6,446,088 B1
(45) Date of Patent: *Sep. 3, 2002

(54) APPLICATION-DIRECTED VARIABLE-GRANULARITY CACHING AND CONSISTENCY MANAGEMENT

(75) Inventors: Bharghavan Vaduvur; Dane Dwyer, both of Urbana, IL (US)

(73) Assignee: The Board of Trustees of the University of Illinois, Urbana, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 126 days.

This patent is subject to a terminal disclaimer.

(21) Appl. No.: 09/268,819

(22) Filed: Mar. 16, 1999

Related U.S. Application Data (63) Continuation of application No. 08/829,870, filed on Apr. 1, 1997, now Pat. No. 6,021,413.

(51) Int. Cl.[7] .............................................. G06F 17/00
(52) U.S. Cl. ...................... 707/201; 707/203; 709/246
(58) Field of Search .............................. 707/201, 8, 10, 707/203, 204; 364/100, 138; 709/217, 246

(56) References Cited

U.S. PATENT DOCUMENTS

| | | | |
|---|---|---|---|
| 4,466,098 A | | 8/1984 | Southard ........................ 371/9 |
| 4,745,559 A | * | 5/1988 | Willis et al. .................... 705/37 |
| 5,163,148 A | * | 11/1992 | Walls |
| 5,418,945 A | * | 5/1995 | Carter et al. .................... 707/8 |
| 5,479,654 A | * | 12/1995 | Squibb ........................ 707/201 |
| 5,555,391 A | * | 9/1996 | Subijana et al. ............. 711/113 |
| 5,671,357 A | * | 9/1997 | Humblet et al. ........ 395/200.72 |
| 5,721,907 A | * | 2/1998 | Pyne ............................ 707/10 |
| 5,734,902 A | | 3/1998 | Atkins ......................... 395/683 |
| 5,790,848 A | * | 8/1998 | Wlaschin ..................... 707/201 |

(List continued on next page.)

OTHER PUBLICATIONS

Ingrid J. Wickelgren, "Local–Area Networks Go Wireless," *IEEE Spectrum*, Sep., 1996, pp. 34–40.

James J. Kistler and M. Satyanarayanan, "Disconnected Operation in the Coda File System," *ACM Transactions on Computer Systems*, vol. 10, No. 1, Feb., 1992, pp. 3–25.

(List continued on next page.)

*Primary Examiner*—Safet Metjahic
*Assistant Examiner*—Uyen Le
(74) *Attorney, Agent, or Firm*—Fitch, Even, Tabin & Flannery (57) ABSTRACT

A system and method for application-directed variable-granularity consistency management, in one embodiment, carries out the steps of: predefining a template specifying a structure of a file; imposing the template on the file including registering fields/records within the file for consistency; creating an index table for the file; detecting a write to the file, at one of a file system server and a file system client; and queuing, upon detecting the write to the file and in the event a portion of the file to which the write occurs is registered for consistency, the write for propagation to another of the file system server and the file system client. The system and method may employ an application program that predefines a template specifying a structure of a file and imposes the template on the file including registering fields/records within the file for consistency; and further employs a file system that creates an index table for the file; detects a write to the file, at one of a file system server and a file system client; and queues, upon detecting the write to the file and in the event a portion of the file to which the write occurs is registered for consistency, the write for propagation to another of the file system server and the file system client.

25 Claims, 2 Drawing Sheets

U.S. PATENT DOCUMENTS

| | | | | | |
|---|---|---|---|---|---|
| 5,806,075 | A | * | 9/1998 | Jain et al. | 707/201 |
| 5,812,793 | A | * | 9/1998 | Shakib et al. | 395/200.31 |
| 5,826,253 | A | * | 10/1998 | Bredenberg | 707/2 |
| 5,829,001 | A | * | 10/1998 | Li et al. | 707/10 |
| 5,860,124 | A | * | 1/1999 | Matthews et al. | 711/165 |
| 5,873,096 | A | * | 2/1999 | Lim et al. | 707/201 |
| 5,930,504 | A | * | 7/1999 | Gabel | 395/712 |
| 6,088,717 | A | * | 7/2000 | Reed et al. | 709/201 |

OTHER PUBLICATIONS

Alan Demers, Karin Peterson, Mike Spreitzer, Douglas Terry, Marvin Theimer and Brent Welch, "The Bayou Architecture: Support for Data Sharing Among Mobile Users," IEEE Workshop on Mobile Computing Systems and Applications, 1994.

Douglas B. Terry, Marvin M. Theimer, Karin Petersen, Alan J. Demers, Mike J. Spreitzer and Carl. H. Hauser, "Managing Update Conflicts in Bayou, a Weakly Connected Replicated Storage System", Proceedings of the Fifteenth ACM Symposium on Operating System Principles, Dec., 1995.

M. Satyanarayanan, Brian Noble, Puneet Kumar, and Morgan Price, "Application–Aware Adaptation for Mobile Computing," Proceedings of the Sixth ACM Sigops European Workshop, Sep., 1994, Dagstuhl, Germany.

Peter Reiher, John Heidemann, David Ratner, Greg Skinner, and Gerald Popek, "Resolving File Conflicts in the Ficus File System," Proceedings of the 1994 Summer Usenix Conference.

Bruce Zemel and Dan Duchamp, "Intelligent Communication Filtering for Limited Bandwidth Environments," Proceedings From Fifth Workshop on Hot Topics in Operating Systems, IEEE, Rosario, WA, May, 1995.

"Shiva Corporation Acquires Airsoft, Inc., Provider of Powerburst Remote Node Accelerator Software," Web Site Address: http://www.shiva.com/corp/press/airsoft.html (2 pages) (1996).

"Powerburst v2.0," Web Site Address: http://www.airsoft.com/newv20.html (2 pages) (1996).

Hui–Jang Chang et al "The Management and Applications of Teleaction Objects", Multimedia Systems vol. 3, No. 5/6 pp. 204–216 (1995).

Ira B. Greenberg and Peter K. Rathman, "Distributed Database Integrity," SRI International/Rome Laboratory, Air Force Systems Command, Griffiss Air Force Base, NY, RL–TR–92–36 Final Technical Report (Mar. 1992), Cover page, Approval page, Report Documentation Page and pp. i–61.

* cited by examiner

APPLICATION-DIRECTED VARIABLE-GRANULARITY CACHING AND CONSISTENCY MANAGEMENT

This is a continuation, of prior application Ser. No. 08/829,870, filed Apr. 1, 1997 now U.S. Pat. No. 6,021,413, which is hereby incorporated herein by reference in its entirety.

BACKGROUND OF THE INVENTION

The present invention relates to wireless access to data files, and more particularly to such wireless access over a communications channel susceptible to sudden and dramatic changes in quality of service and availability of service. Even more particularly, the present invention relates to an application-directed variable-granularity approach for caching and consistency management for use over a communications channel susceptible to sudden and dramatic changes in quality of service and availability of service.

In recent years there has been an increase in the number of commercially available local and wide area wireless networking technologies that provide data rates in the Kbps to Mbps range, e.g., ARDIS, RAM, CDPD, Metricom, RangeLan2, and Wavelan. Mobility and network connectivity are thus no longer mutually exclusive, and partial (or intermittent) connectivity is expected to become a predominant networking mode for mobile computing in the near future. While most current commercial mobile computing applications are oriented towards personal communications, e.g., E-mail, fax, telephony, etc., future applications are expected to utilize wireless bandwidth for both information access and personal communications. There is thus a critical need for efficient data access mechanisms during wireless operation.

Heretofore, mobile file systems have typically assumed two extreme modes of operation: full network connection to a high bandwidth wired network when, for example, a portable computer is docked to a network access point; or complete network disconnection when, for example, the portable computer is undocked from the network access point. When fully connected, a file system hoards (or predictively caches) files that it predicts a user will need during completely disconnected operation. In other words, during periods when the portable computer is docked, all of the files needed by the user are hoarded (or loaded) into the portable computer for use when the portable computer is undocked. When the portable computer is disconnected, the file system performs reads from, and writes to, the hoarded copies of the files.

Among others, the following two problems arise as a consequence of using only these two extreme modes of operation: (a) a critical file may not be hoarded and this may stall the work of the disconnected user until he/she again obtains a full network connection, and (b) files may end up becoming inconsistent upon resumption of a full network connection due to writes to both the hoarded copy on the portable computer and to the copy on the file system, i.e., the backbone copy, while the portable computer is disconnected. Neither of these problems can be prevented (or even solved satisfactorily) using heretofore known mobile file systems because communication with such file systems is precluded while the portable computer is disconnected, i.e., undocked.

A further problem with state of the art mobile file systems is that when fully connected with bandwidth dedicated to the portable computer, the portable computer may not make full and efficient use of such bandwidth. For example, the bandwidth may not be fully or efficiently utilized while the portable computer waits for user input, thus wasting valuable bandwidth. On the other hand, if such bandwidth is not dedicated to the portable computer, but rather shared amongst several computers, the need to hoard copies of all of the files the user may wish to access may similarly result in significant wasted bandwidth. Specifically, many files or parts of files that will not in fact be used while the portable computer is disconnected are typically hoarded either because, absent a priori knowledge of the user's needs, the mobile file system concludes that they might be used (i.e., because the mobile file system incorrectly predicts that they will be used), or because they are parts of files, other parts of which will be used.

SUMMARY OF THE INVENTION

The present invention advantageously addresses the needs above as well as other needs by providing a an application-directed variable-granularity approach for caching and consistency management useable over a communications channel susceptible to sudden and dramatic changes in quality of service and availability of service.

The present invention can be characterized, in one embodiment, as a method of application-directed variable-granularity consistency management having steps of predefining a template specifying a structure of a file; imposing the template on the file including registering fields/records within the file for consistency; creating an index table for the file; detecting a write to the file, at one of a file system server and a file system client; and queuing, upon detecting the write to the file and in the event a portion of the file to which the write occurs is registered for consistency, the write for propagation to another of the file system server and the file system client.

In another embodiment, the invention can be characterized as a system employing an application program that predefines a template specifying a structure of a file and imposes the template on a file including registering fields/records within the file for consistency; and further employing a file system that creates an index table for the file; detects a write to the file, at one of a file system server and a file system client; and queues, upon detecting the write to the file and in the event a portion of the file to which the write occurs is registered for consistency, the write for propagation to another of the file system server and the file system client.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figures 1, 2:
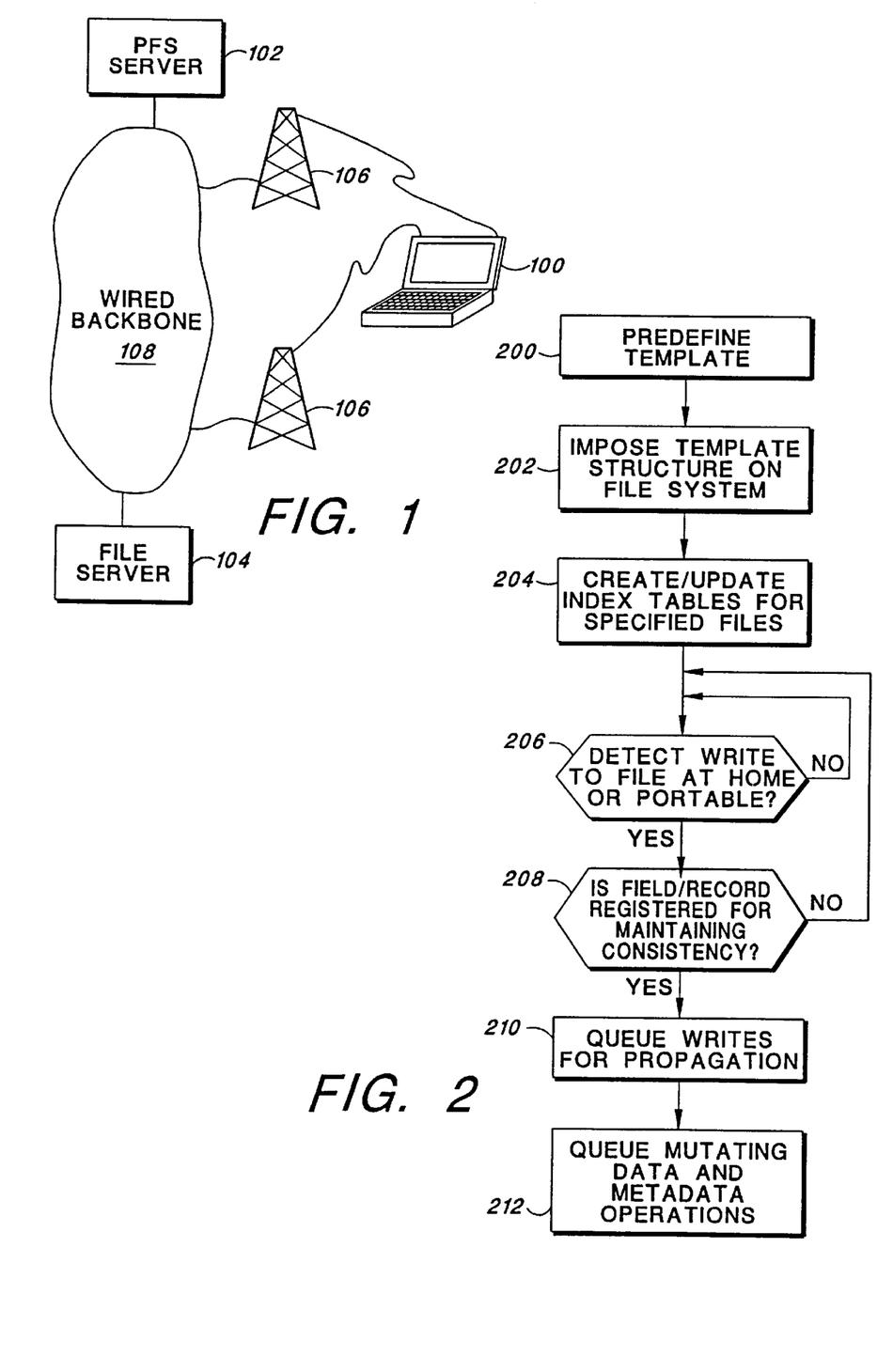
FIG. 1 is a block diagram of a networking model for a file system in accordance with one embodiment of the present invention.
FIG. 2 is a flow chart illustrating steps traversed by one variation of an approach to application-directed partial file consistency useable in the embodiment of FIG. 1.

Referring first to FIG. 1, a networking model is shown for a file system in accordance with one embodiment of the present invention. Shown are a file system client (a portable computer) 100, a file system server/file client (a host) 102, a file server 104, wireless communications infrastructure 106 and a wired backbone 108.

The wired backbone 108 may, for example, be a NFS network file system (by SUN COMPUTER). The file system server/file client 102 mounts directories from the file server 104 using standard NFS mechanisms. The file system client (portable computer) 100 caches files from the file system server/file client 102.

The present embodiment involves a three tier model, with client-server interactions between the file server 104 and the file system server/file client 102, and between the file system server/file client 102 and the file system client (portable computer) 100. The extra level of indirection, i.e., the file system server/file client 102, as compared to heretofore used approaches, enables implementation of application-dependent and quality-of-service-dependent (QoS-dependent) adaptive caching and consistency policies. As a result, a major time and cost savings during partial connection is realized, at a cost of incurring tolerable processing overhead during fully connected operation. The level of indirection employed in the present embodiment advantageously also restricts problems associated with concurrent read/write access by multiple clients to the file server 104.

Note that Quality of Service (or QoS) refers, in standard networking terminology, to a set of parameters that collectively define the quality of a network, or a network connection. A typical set of Quality of Service parameters includes: throughput/data rate, latency/end-to-end delay, delay jitter or variance in delay, probability of packet error, and probability of handoff blocking. Quality of Service can also be expressed in terms of a class. For example, Quality of Service classes may include: ETHERNET, WIRELESS LAN, SLIP, RAM/CDPD, and DISCONNECTED. A Quality of Service class typically defines upper and lower bounds of each Quality of Service parameter. In accordance with the present embodiment, it is assumed that a separate network module determines Quality of Service class. An application can determine Quality of Service class from this module, and proceed based on the Quality of Service class available.

Based on the above, the present embodiment provides the following services to applications:

(a) A mechanism to hoard files during fully connected operation, in order to support local access during partially connected operation and disconnected operation;

(b) Application-directed variable-granularity consistency policy management between information cached on the file system client (the portable computer) 100 and corresponding copies of such information at the file system server/file client 102;

(c) Multiple levels of reads and writes, e.g., (i) consistent read; (ii) local read; (iii) write through; (iv) write back; and (v) write local;

(d) Support for completely disconnected operation, wherein only local reads and local writes are performed on hoarded files;

(e) Detection of inconsistencies in files and in individual fields/records; and (f) Provision of a simple interface through which applications interact with the file system and specify their consistency policies.

The file system has two default modes of operation, connected (i.e., fully connected) and stand alone (i.e., partially connected). The file system makes use of adaptive run time support in a manner similar to that in which applications make use of adaptive run time support, and switches between connected mode and stand alone mode, depending on whether current network quality of service is above or below a given threshold.

In connected mode, the file system keeps cached files at the portable computer totally consistent with copies of such files at the file system server. Unlike in prior systems, in stand alone mode, the file system does not perform consistency on a whole file basis. Instead, applications are expected to make known to the file system which parts of the files need to be kept consistent. (Thus, application-directed variable-granularity.) Thus, the file system does not alter the wired backbone file system behavior when fully connected, and keeps only critical parts of cached files consistent with the file system server/file client 102 (as directed by the application) when partially connected. The file system supports disconnected operation in an extreme case.

Thus, the design of the present embodiment has three important aspects: (a) application directed consistency management, (b) multilevel reads and writes; and (c) disconnected operation.

With regard to application directed file consistency, many applications that can benefit from the file system of the present embodiment employ structured or semi-structure data. In such applications, partial connectivity can be used to keep critical parts of cached files consistent between the file system client (the portable computer) 100 and the file system server/file client 102.

Referring to FIG. 2, application-directed partial file consistency is achieved as follows:

(a) (Block 200) An application predefines templates that specify the semantic structure of a file. The template files specify a hierarchy of regular expressions that mark record and field boundaries within the data file. The record/fields in the template structure may be nested, unordered, or overlapped:

(b) (Block 202) The application imposes a template structure on a file by invoking a PCONSISTENCY library call, with the following arguments: file name, template name, field/records to keep consistent, and fall back behavior.

(c) (Block 204) The PCONSISTENCY call causes the file system client (the portable computer) 100 and the file system server/file client 102 to create (or update) an index table for the specified file. For each record or field in the file, the index contains the following information: start position, size, version-vector and registration. The version-vector timestamps the last update, and is used to detect conflicts. The registration information specifies whether the field of such record is to be kept consistent between the file system client (portable computer) 100 and the file system server/file client 102. A whole-file version-vector and a metadata version-vector is also maintained. The whole-file version-vector is used by a PHOARD call to determine whether a currently cached copy of a file (any portion thereof) at the file system client (portable computer) 100 is older than a copy at the file system server/file client 102. The metadata version-vector is used by the file system to determine whether, e.g., a "file size", a "file type", an "owner" of the file, "read/write" permissions with respect to the file for the user, group, and world, a "last accessed time" or a "last modified time" at the file system client 100 is older than a similar file parameter (i.e., similar metadata) at the file system server/file client 102. (Note that other file system clients on the wired backbone 108 may also access the file and consistency management for such accesses is governed by standard backbone semantics. The file system for the present embodiment only handles consistency management between the file system client (personal computer) 100 and the file system server/file client 102.)

(d) (Block 206) Upon writes to the file, either at the file system client (the portable computer) 100 or the file system server/file client 102, the index table is updated, if required, and (Block 210) the write is queued for propagation to the file system client (the portable computer) 100 or the file system server/file client 102, respectively, (Block 208) if that field/record is registered by an application for maintaining consistency.

Queued writes are transferred periodically, e.g., every sixty seconds, thus providing a write-back consistency at the granularity of sixty seconds.

(e) (Block 212) All other mutating data operations, i.e., all mutating data operations other than writes, and all metadata operations are queued for propagation to the file system client (the portable computer) 100 or the file system server/file client 102, respectively. Each queue (i.e., a queue at the file system client (the portable computer) 100 and a queue at the file system server/file client 102) contains both the mutating data or metadata operation, and the quality of service class at which it was performed.

Since the queue at the file system client (the portable computer) 100 and the queue at the file system server/file client 102 are flushed periodically, e.g., every 60 seconds, it is possible for the file system client (the portable computer) 100 to disconnect (or lower its quality of service class) while the queue is not empty. When the file system client (the portable computer) 100 reconnects (or increases the quality of service class) all queued writes that have been performed at or lower than the current quality of service class are propagated in timestamped order to the file system client (portable computer) 100 or file system server/file client 102, respectively.

(f) Fallback behavior is invoked upon either a conflict detection or a network disconnection. Conflicts can occur either in parts of the file registered for consistency (due to delayed writebacks) or unregistered parts of the file. The former are handled through fallback behavior, while the latter are ignored until the file system client begins fully connected operation. In other words, conflict resolution is only performed on parts of the file that are registered for consistency.

Two fallback options are allowed: "notification" and "local". In the case of notification, the user of the file system client (the portable computer) 100 is notified of the conflict (or disconnection), while in the case of local, the conflict is ignored and the cached copy at the file system client (the portable computer) 100 remains inconsistent with the file system server/file client 102 until the file system client (the portable computer) 100 goes into fully connected mode. Eventually when the file system client (the portable computer) 100 goes into connected mode, the conflicts are handled by assuming that the file system server/file client 102 has the correct version. (Alternatively, either file system client (personal computer) 100 or the file system server/file client 102 may be specified as a conflict controller with conflicts being handled by assuming that the conflict controller has the correct version. In other words, either of the file system client (personal computer) 100 and the file system server/file client 102 may be designated to be assumed to have the correct version.)

Note that in the case of local, fallback treatment of conflicts in parts of the file registered for consistency and conflicts in parts of the file not registered for consistency is similar (i.e., conflicts are in effect ignored until the file system client (portable computer) 100 is fully connected), while in the case of notification, they receive disparate treatment (i.e., notification is performed for parts of the file registered for consistency, while conflicts in parts of the file not registered for consistency are ignored until the file system client (portable computer) 100 is fully connected).

Consistency is broken only if it is explicitly revoked (by a PCONSISTENCY call with no fields defined as consistent), or if the portable computer gets disconnected. Using PCONSISTENCY with fields defined as consistent keeps specified parts of the file consistent across opens and closes. As a result, opening and closing files does not cause additional network traffic.

Note that while registration in the present embodiment of the file system has similarities to prior art callback techniques, significant differences are present: a call registration in accordance with the present embodiment may be at a finer grain, and pertain to an individual record/field in the files, while callbacks are always at a granularity of a file; in accordance with the present embodiment, updates are propagated for registered parts of the file when cache values are inconsistent, while callbacks are simply broken; and callbacks are established upon open, while call registration in accordance with the present embodiment is completely independent of file open/close. Thus, as can be seen, very significant and important differences exist between prior art callback techniques, and the teaching of the present embodiment.

The syntax and operation of the PCONSISTENCY call is illustrated in Table 1.

TABLE 1 pconsistency (file_name, template_name, consistency_fields, fallback)

Operation:
    The pconsistency ( ) call ensures that consistency_fields as
    defined in template_name from file file_name are
    consistent with the server. If the server cannot be
    reached, then the fallback behavior is followed.
Fallback Behavior:
    NOTIFY: Notify the user of a failure to maintain
    consistency and return error.
    LOCAL: Return error.

The embodiment of the file system described supports multiple levels of reads and writes at the file system client (the portable computer) 100, enabling applications to override default consistency behavior for the file on a per request basis. The multi-level reads and writes are performed through special library calls referred to herein as PREAD and PWRITE, which take the following arguments: file descriptor, buffer, length of byte to read or write, level, and fallback behavior. The level field specifies the consistency level of the read/write, and the fallback behavior field specifies the action if the requested level of read/write fails, e.g., "notification" or "local" (see above). Tables 2 and 3 summarize the types of PREAD and PWRITE calls available in accordance with the present embodiment.

TABLE 2 pread (file_descriptor, buffer, length, level, fallback)

Operation:
    The pread ( ) call reads length bytes from the file
    identified by file_descriptor into buffer. The level
    option specifies the consistency level of the read
    operation. For consistent reads, the fallback behavior
    controls what to do when the server cannot be reached.
Level = CONSISTENT_READ; Fallback Behavior;
    Read from the server, cache locally, then return, Fallback
    can be:
    ABORT: Return error.
    BLOCK: Block until server can be reached.
    LOCAL: Read from local copy and return.
Level = LOCAL_READ:
    Read from the local copy and return.

TABLE 3 pwrite (file_descriptor, buffer, length, level, fallback)

Operation:
    The pwrite ( ) call writes length bytes from buffer to the
    file identified by file_descriptor. The level option
    specifies the consistency level of the write operation.
    For consistent writes, the fallback controls what to do
    when the server cannot be reached.
Level = WRITE_THROUGH; Fallback Behavior
    ABORT: Write to server or fail. If remote write succeeds,
    write to local cache and return.
    BLOCK: Block until able to write to server. If remote
    write succeeds, write to local cache and return.
    LOCAL: Write to server. Regardless of results for remote
    write, write to local cache and return.
Level = WRITE_BACK:
    Write to the local copy, queue write for sending to server,
    and return.
Level = WRITE_LOCAL:
    Write to the local copy and return.

A PREAD consistency level may be one of the following: (a) a local read, or (b) consistent read. A local read is performed on the local cache copy at the file system client (the portable computer) 100, while a consistent reads checks for consistency between the file system client (the portable computer) 100 and the file system server/file client 1022, and returns the consistent copy. A side effect of a consistent read is that local copy is updated (if needed) at the file system client (the portable computer) 100.

A PWRITE level may be one of the following: (a) local write, (b) writeback, or (c) writethrough. A local write only writes to the local cache copy at the file system client (the portable computer) 100, a writeback updates the local cache copy and queues the write for transfer to the file system client (the portable computer) 100 (every sixty seconds the queued writes are flushed to the file system client (the portable computer) 100), and writethrough synchronously updates both the local cache copy and the file system server copy.

A PREAD or PWRITE library call may fail due to a number of reasons, including disconnectness (for consistent read, writethrough, writeback), an uncached file (for local read), no disk space (for writes), etc. In each case, the fallback behavior specifies the action to be performed upon failure of the library call and may be one of the following: abort, blocked or local. Abort returns an error upon failure of the request. Block returns an error, if the failure was due to an uncached file (for local read) or lack of disk space (for writes), or blocks (by suspending a current operation and waiting) until network connectivity is reestablished, if the failure was due to disconnectedness. Local is only applicable for consistent read, writethrough and writeback, wherein upon disconnectedness, it converts consistent reads to local reads, and writethroughs to writebacks. Note that during disconnection, the writeback effectively becomes a log file.

By default, the file system maps the standard read library call to a PREAD with local read level and abort fallback, and the standard write library call to a PWRITE with local write level and abort fallback. When either the whole file or relevant parts of the file are kept consistent between the portable and the home, the underlying consistency mechanism ends up overriding the local read/write. Advantageously, during disconnection, and for parts of the file that are not kept consistent during partial connectedness, the standard read/write call does not incur network overhead.

It is assumed that applications typically use the standard read/write library calls in conjunction with the application directed consistency policy. The PREAD and PWRITE library calls provide a mechanism to override the standard read/write behavior and serve to enforce consistent reads/writes on a per call basis.

It is further assumed that partial connectivity, in accordance with the present embodiment, is the common mode of operation, and it is also assumed that applications are typically "smart" enough to optimize their file consistency. Thus, support for disconnected operation in the present embodiment is rudimentary.

The present embodiment does not have any special default mechanisms for hoarding files. A user may explicitly hoard a file using a PHOARD library call, which will cache the file in all directories in its path. However, as has been noted previously, a user may not be able to predict all of the files required for disconnected operation in advance, because he/she may not be aware of all the files required by an application for execution. Intelligent mechanisms for predictively caching both user data and system/resource files are generally required during file hoarding, however, such predictive systems are flawed at best. Also, as mentioned above, hoarded files are very susceptible to concurrent writes, thus rendering them vulnerable to inconsistencies.

Fallback behavior determines the action to be taken upon disconnection for the PREAD, PWRITE and the PCONSISTENCY library calls. Upon disconnection, the PCONSISTENCY call may either go into local mode, or notify the user of the disconnection (i.e., "notification" or "local" fallback modes).

Standard reads and writes are mapped by default to local read/writes, and are not affected by disconnection. The consistent PREAD library call and writethrough/writeback PWRITE library calls will (as mentioned above) return an error, and may either abort, or block, or may fallback on the local copy. A local read on an uncached file will fail and return an error.

The present embodiment can detect concurrent write/write conflicts, but not read/write conflicts. Upon reconnection the present embodiment will detect write/write conflicts by comparing version vectors at the granularity of a whole file, and at the finer granularity of a record or a field, depending on the current consistency semantics. Conflicts are aggregated (i.e., all conflicts are listed in a file, and all changes that are discarded are also written to a file) and the user is notified.

While the present embodiment does not resolve conflicts, it is envisioned by the inventors that a more intelligent future embodiment will not only detect but also resolve conflicts, based on an approach similar to that described in Demers, "The Bayou Architecture: Support for Data Sharing Among Mobile Users", IEEE Workshop on Mobile Computing Systems and Applications, 1994; and/or in Terry, "Managing Update Conflicts in Bayou, a Weakly Connected Replicated Storage System, Proceedings of the Fifteenth ACM Symposium on Operating System Principles", December 1995. Both the Demers and Terry references are hereby incorporated by reference herein as if set forth in their entirety.

The template file not only contains the structure of records and fields, but also optional procedures for conflict detection and conflict resolution for each field/record/template structure. Upon reconnection or change of the consistency fields in PCONSISTENCY, the conflict resolution procedure is invoked in order to resolve detected conflicts.

Figure 3:
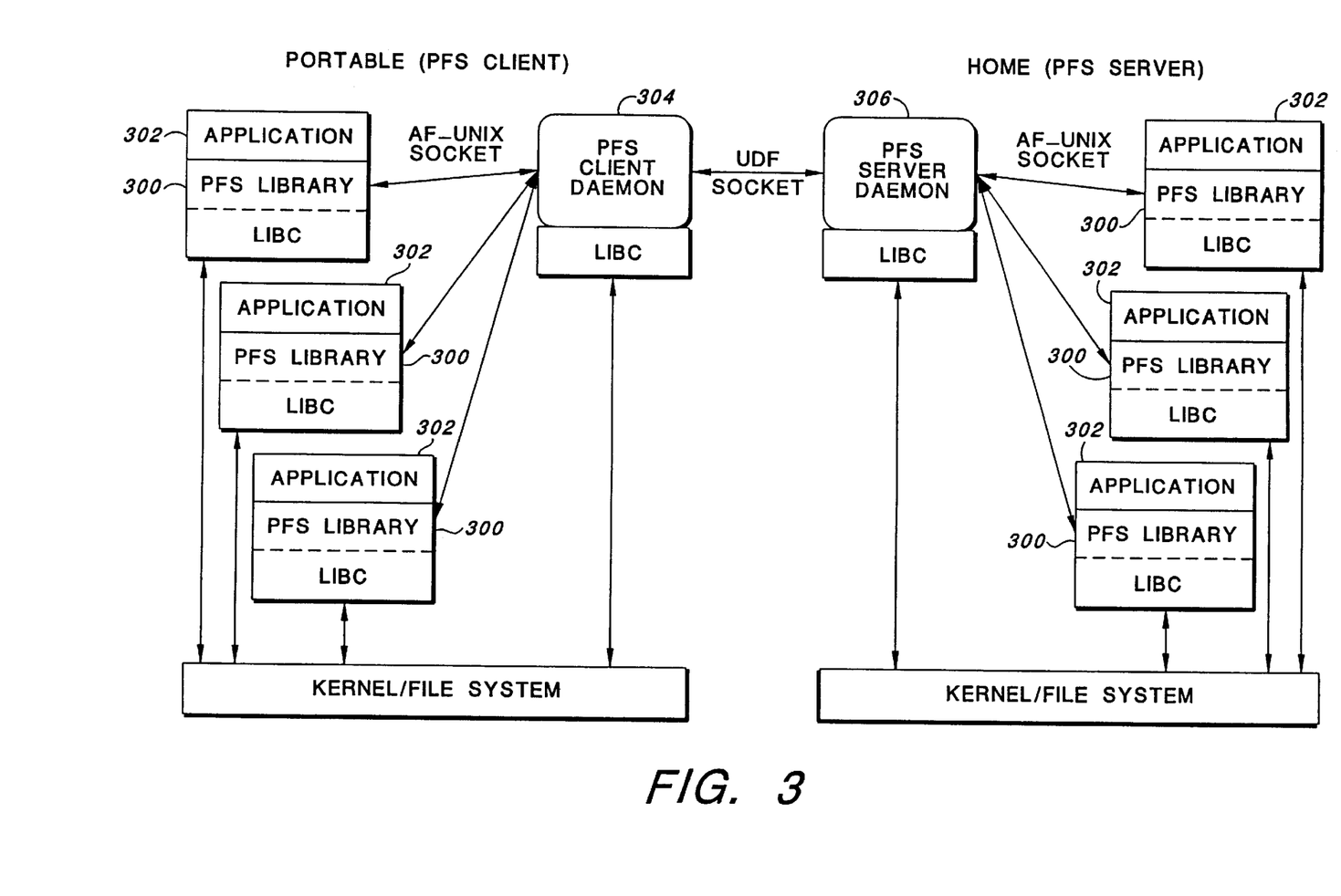
FIG. 3 is a high level block diagram of various components used in a file system client and a file system server used in the embodiment of the file system of FIG. 1.

Referring to FIG. 3, a high level block diagram is shown of various components used in the file system client and the file system server. A shared library 300 is linked into applications 302 at run time and provides the support routines for PREAD, PWRITE, PCONSISTENCY AND PHOARD library calls and performs name space mapping.

A client daemon 304 runs on the file system client (the portable computer) 100 and coordinates all remote file accesses by client applications. The server daemon 306 runs on the file system server/file client 102 and services all remote file accesses by the client daemon 304. Applications apply data format templates to both the client daemon 304 and server daemon 306 to support application-directed consistency control.

In accordance with the present embodiment, both the file system client (portable computer) 100 and the file system server/file client 102 are user level processes. Communication is implemented through BSD sockets but could be implemented through RPC. The implementation architecture is simple and highly portable, making porting of the software to, for example, Windows 95, Windows NT, Windows CE, Macintosh, or other operating systems, possible without architectural changes. All configuration information for the file system is handled through environment variables, and therefore can be adjusted on a per-application basis.

For example, the file system client cache directory is passed to the shared library using, for example, the PFS_ENABLE environment variable.

The shared library provides both mobility-aware and mobility-unaware applications with access to the mobility support features of the file system. Mobility unaware applications are supported by linking the shared library into the mobility unaware applications at run time.

As mentioned above, the shared library defines the PREAD, PWRITE, PCONSISTENCY and PHOARD library calls. In addition, the shared library also includes a set of low level file input/output routines that override (overload) the low level file input/output routines normally provided by the operating system. The overridden system routines can be grouped into four categories: non-mutating directory operations, such as opendir, stat, lstat, readlink, access, chdir, and chroot; mutating directory operations, such as: mkdir, chown, chmod, rmdir, unlnk, symlak, link, rename, utime and cimes; non-mutating file operations, such as: open, exec1, execle, execv, execve, execvep, and read; and mutating file operations, such as: create, truncate, and write. All of the overridden system routines are modified to parse the PFS_ENABLE environment variable the first time any one of them is called in order to perform name space mapping of files accessed in the file system client's cache.

Note that by using an environment variable to configure the host port number, and cache directory, each application can potentially work out of its own cache, or share a global cache.

All mutating operations log their actions to an output queue for sending to the file system server/file client 102. (Note that when disconnected, the output queue essentially becomes a log file.) If operating in stand alone mode, then all of the routines operate by default on the local copy of the file and no network traffic is generated. If operating in connected mode, then mutating and non-mutating directory operations will first fetch file metadata from the file system server/file client 102, and then operate on the locally cached data. Mutating operations log their actions to the output queue.

A TRUNCATE library call and all non-mutating file operations, with the exception of PREAD, use PHOARD to cache the whole file prior to accessing the local copy. Additionally, the TRUNCATE library call writes an entry to the output queue. Regardless of the current connection mode, all read and write operations mapped to PREAD and PWRITE have cache only access.

The CREATE library call always creates the new file directly into the local cache.

The client daemon 304 is the background process that runs on the file system client (the portable computer) 100 and "listens" for PREAD, PWRITE, PHOARD, and PCONSISTENCY requests from client applications. The client daemon 304 acts as the central contact point for the file system client (the portable computer) 100, maintaining state and managing consistency for every application on the system. File data from the file system server/file client 102 is cached by the client daemon 304 using the file system client's (the portable's) native file system. The client daemon 304 also creates and maintains auxiliary files that contain end of session version vectors for the consistency fields of registered files. These version vectors are used to check for fine grain changes to files, and for the detection of write/write conflicts between the portable and the file system server.

When the client daemon 304 receives a PCONSISTENCY request from an application, it first checks to see if the file has already been registered. If not, a check is made to see if the file has been cached. If the file has not been cached, then the server daemon 306 is contacted and the fields for which consistency is desired are transferred to the client cache. Once cached, the client daemon 304 registers the fields or records for which consistency is being requested, so that the changes made to the server copy of the file will cause the server daemon 306 to notify the client daemon 304 of such change.

Whenever a new file is fetched from the file system server/file client 102, the index and version vector information relative to the specified template are also sent to the client daemon 304. This index file is updated by the client daemon 304 whenever the file is modified. Version vectors are compared between the client and server to identify which portions of the file must be transferred upon update, and also to detect write/write conflicts.

If the client daemon 304 is notified of a conflict, then changes made to the file on the client are saved, replaced with the server version, and the user is notified of the conflict (assuming "notification" is the fallback behavior selected). In accordance with the present embodiment, no effort is made to resolve the conflict automatically, although it is contemplated that such could be accomplished using heretofore known techniques or improvements thereon.

The role of the server daemon 306 is to handle read/write and consistency requests from one or more client daemons 304. The server daemon 306 runs as a background operation on the file system server/file client 102 and serves files from any of one or more readable or writable partitions mounted on its file system, e.g., such as network volumes from the file server 104. Thus, the file system client (the portable computer) 100 can access files stored on machines other than the file system server/file client 102 as long as the files are directly accessible from the file system server/file client 102, such as through its local area network. Since the server daemon 306 runs with privileges granted to the user (rather than root)) only those files that are normally accessible to the user of the file system server/file client 102 are made available to the file system client (the portable computer) 100.

When a file is registered by a client daemon 304, the server daemon 306 monitors the metadata of that file at 60 second intervals to detect server side changes. If a change is detected on the server side, the index file is recomputed, the registered portions are queued, and the queue is flushed to the client daemon 304.

Before responding to a PCONSISTENCY request from a client daemon 304, the server first consults the index and version vector file corresponding to the specified template. If the index file is outdated or does not exist, the server daemon 306 precomputes all of the indices and assigns them a unique version vector. In subsequent operations with the client daemon 304, the version vector is used for the detection of write/write conflicts.

When conflicts are detected the client daemon 304 is notified immediately. As mentioned above, in accordance with the present embodiment, the server copy is always assumed to be correct, leaving it up to the client daemon 304 to "resolve" any file conflicts.

Applications inform the file system of their data file semantics through data format templates. All templates are stored in a single configuration file identified by distinct names and are used by both the client daemon 304 and the server daemon 306.

In order to handle a wide variety of data files, three distinct forms of templates are employed: fixed length templates specify field lengths in bytes; variable length continuous templates specify strings that identify record and field boundaries in data files in which for contiguous templates all fields must occur in the specified order, cannot be nested, and have no missing fields; variable length generic templates are specified using regular expressions and subsequently have fewer restrictions than the variable length contiguous templates or fixed length templates in that, for example, they can have fields that nest, overlap, are missing, or occur in any order. Variable length generic templates are the most processor intensive of these three different forms of templates.

Index computation is trivial in the case of fixed length templates but may be involved in the case of a variable length generic template. The basic format of a template expression is shown below. Colons are used to separate different depths of field nesting, and the backslash can be used to extend the template onto more than one line. Note that templates cannot use combinations of fixed, variable length contiguous and variable length generic forms in the same definition.

Template_Name: (Record Separators) [\
   Id1=(Field Separators), . . . [\
   Id2=(Subfield Separators), . . . ]]

Templates consist of a Template_Name, followed by a colon, followed by a record separator. If records can be broken down into individual fields or subfields, these can be specified using additional colon-separated entries in the template. Records within a file are uniquely identified by their location relative to the beginning of the file. Fields and subfields within a record are identified by the Id values specified in the template file.

For fixed length templates, the records separated are simply the record or the field length. For variable length contiguous templates the field separator is a ("marker string", index) pair. The marker string is a search string that identifies the record or field boundary, and the index is the number of bytes from the beginning of the marker string to the true boundary point. In the case of variable length generic templates, the separator is described using two regular expressions, one that matches the start of the field, and another that matches the end of the field. As with contiguous templates, each regular expression has an index to precisely identify the boundary location within the matching expression.

The following are examples of a fixed length template, a variable length contiguous template, and a variable length generic template for an e-mail spool file, such as might be used with the e-mail system described below in the example.

Fixed_Sized_Example \
   : (1024) \
   : 0.1=(16), 0.2=(512), 0.3=(496) \
   : 0.1.1=(8), 0.1.2=(8), 0.2.1=(256), 0.2.2=(256)

This template defines 1,024 byte records with three subfields of lengths 16, 512, and 496 bytes respectively. Sub field one consists of two eight byte fields and sub field two has two 256 byte fields.

Variable_Sized Contiguous_Example \
   : (*\n\n\nFrom *,2):0.1=(*\nFrom: *,1), \0.2=(*\nSubject: *,1), 0.3=(*\n\n*,2)

For this template, records are separated by "/nFrom", and contain three subfields. The first sub field starts with "From:", the second sub field starts with "Subject: ", the third starts after two new lines. For string matches, field lengths are not computed and are assumed to span between separators.

Variable_Fixed_Generic_Example \
   : (/F/,0-/\n\nFrom /,1) \
   : 0.1=(/F/,0-/\n\n/,0), \0.2=(/\n/,0-/\n\nFrom *,0) \
   : 0.1.1=(/\nSubject: *,1-/\,0), \0.1.2=(/\nFrom: /,1-/n/,0).

The regular expressions used in the generic template are specified using surrounding slashes (i.e., /F/) for fields defined by regular expressions, field indices are computed in a recursive manner, starting with records and working down to the deeper fields. Subfields are only searched for within the higher level fields in which their Id belongs. For example, in the above example, the "Subject:" and "From:" fields are only searched for within the e-mail headers. Since the higher level boundaries are already known, this makes it possible to identify missing and out of order sub fields.

In the argument list for PCONSISTENCY library calls, the field for which consistency is desired must be listed. Since records are in numerical order starting with record one at the beginning of the file, consistency fields can be specified using number ranges and wild cards. In addition, the special character $ can be used to represent the number of the last record in the file. For example, consistency for the "Subject:" fields of the last ten e-mail messages can be denoted by: $-10.1.1-$0.1.1 for the example below. Consistency of all the "Subject:" and "From:" fields are denoted by: *0.1.1.

EXAMPLE

The following example relates to an e-mail system employing the teachings of the above-described embodiment. There are two processes involved in the e-mail system: the e-mail background that keeps desired parts of a mail spool file consistent between the portable and the file system server and an e-mail frontend, which allows the user to browse e-mail headers, and selectively read e-mail messages.

The background runs continuously and illustrates application-directed consistency depending on an available quality of service, while the frontend is a user invoked process that illustrates the use of PREAD to override the default consistency provided by the background. The e-mail background of the present example is designed to handle two possible quality of service classes: Ethernet and Ram. In the Ethernet class, the background keeps the entire mail spool file consistent, while in the Ram class, the background keeps only the "from" and the "subject" fields consistent.

The template structure used for the spool file is as follows:
Variable_Fixed_Generic_Example \
: (/F/,0-/\n\nFrom /,1) \
: 0.1=(/F/,0-/\n\n/,0), \0.2=(/\n/,0-/\n\nFrom *,0) \
0.1.1=(/\nSubject: *,1-/\,0), \0.1.2=(/\nFrom: /,1-/\n/,0)

The following are relevant parts of e-mail backend code with five points of interest indicated using parenthetical numbers in the margin.

```
        email_backend( ) {
            ...
(1)     make_QoS_Option(&QoS_Struct, 2);
        set_QoS_Option(&QoS_Struct, O, ETHERNET
                    proc_ether, ROLLBACK, ROLLBACK)
(2)     set_QoS_Option(&QoS_Struct, 1, RAM, proc_ram,
                    ROLLBACK, ROLLBACK);
(3)     get_QoS(&QoS_Struct);
            ...
        }
        proc_ether( ) {
            ...
(4)     Pconsistency(mailspool, MAIL_TML, *, LOCAL);
(5)     pause( );
            ...
        }
        proc_ram( ) {
        Pconsistency(mailspool, MAIL_TML, *.1.*, LOCAL);
        pause( );
            ...
        }
```

Items (1), (2) and (3) above relate to adaptive run time support.

(1) make_QoS_Option call specifies the number of options provided for the subsequent get_QoS_call.

(2) The get_QoS_Option call takes 6 parameters: the pointer to the QoS structure (&QoS_Struct), the index of the option (0), the desired QoS class (Ethernet), the procedure to execute if that class is satisfied (Proc_ether), the action to perform if the QoS goes below the negotiated class (ROLLBACK), and the action to perform if the QoS goes above the negotiated class (ROLLBACK).

(3) The get_QoS call handles both QoS negotiations and reaction to notification. When get_QoS is called, the run time system finds the highest QoS class among the options that it can satisfy, and executes the corresponding procedure (e.g., if Ethernet can be satisfied, it will execute Proc_ether. If, during execution of the procedure, the QOS goes below the specified QoS class, then the action corresponding to the decrease of QoS class (ROLLBACK) is performed.

Note that four possible actions are allowed: rollback, abort, block or ignore. Rollback will go to the start of the get_QoS call, and start the procedure corresponding to the currently highest QoS class. In the above example, if during execution of the Proc_ether call the QoS comes down from Ethernet to Ram, the effect is to abort Proc_ether and to start the execution of Proc_ram.

(4) In Proc_ether, the application specific whole file consistency (which is the default for the file system in the connected mode).

The PCONSISTENCY function is invoked with the file name (mail spool) template name (mail.tm1), consistency flags (*), and fallback behavior (local).

(5) The pause then suspends the process until a SIGUSR1 signal (by appropriately setting the mask) from the runtime system signifies a change in the QoS class. If the QoS class is now Ram, Proc_ram is invoked, and it's effect is to change the consistency policy from whole file to only the "From" and "Subject" fields.

The above description of the background illustrates two-points: (a) PCONSISTENCY and get_QoS have close interaction, and (b) the consistency is completely independent of opens and closes.

The e-mail frontend is designed to let the user browse through the headers of all e-mail messages ("From" and "Subject" fields), and then read specific e-mail messages selected by an index number. The relevant parts of the e-mail frontend are given below, and points of interest indicated by parenthetical numbers located in the margins.

```
        email_frontend( ) {
            ...
(1)     fd = open(mailspool, O_RDONLY);
            ...
        operation = get_input( );
        switch(operation) {
        case BROWSE_HEADERS:
            ...
            index = O;
            while (get_email(index, &pos, &len)) (
                index ++;
            lseek(fd, pos,, SEEK_SET);
(2)         read(fd, buffer, len);
                ...
        }
            ...
        break;
        case GET_EMAIL MESSAGE:
            ...
        index = get_email_index( );
        if (get_email(index, &pos, &len)) {
        lseek(fd, pos, SEEK_SET);
(3)     pread(fd, buffer, len
                    CONSISTENT_READ, ABORT);
        }
            ...
        break;
            ...
        }
            ...
        }
```

By way of example, consider the QoS class to be Ram. The background thus has the "From" and "Subject" fields consistent for the messages, but not the body of the messages.

(1) The file open is independent of the consistency policy. In fact, in the present example, the application that maintains consistency (i.e., the e-mail background) is different from the application that uses the consistency for its reads (i.e., the e-mail frontend).

The frontend allows the user to select the operation using get_input. If the operation is to browse the headers, the frontend repeatedly gets the start position and length of the next e-mail message (it may use an index table for this purpose); seeks to specify the location in the file; and reads the message.

(2) The read call automatically maps to a local read in the file system. Since the headers are consistent, the read call returns the latest (with the 60 second propagation delay) e-mail headers. However, the body of the messages may be inconsistent, and may be composed of all zeros at the file system client (portable computer) 100 if they have not yet been retrieved from the file system server/file client 102.

(3) If the user desires to read specific e-mail message, a consistent read is performed through a PREAD library call, which specifies the consistent_read option and abort fallback. This read synchronously accesses the file system server and aborts the read request upon failure to access the file system server.

While the invention herein disclosed has been described by means of specific embodiments and applications thereof, numerous modifications and variations could be made thereto by those skilled in the art without departing from the scope of the invention set forth in the claims.

What is claimed is:

1. A file management system comprising:
   a first computer comprising a memory adapted to store one or more stored files;
   a second computer adapted to transmit data to and receive data from said first computer, said second computer also adapted to receive one or more of said one or more of said stored files from said fist computer;
   means for modifying said one or more stored files by said first and second computer in response to an application consistency request;
   means for detecting whether said one or more of said stored files stored in said first computer has been modified;,
   means for detecting whether said one or more of said stored files stored in said second computer has been modified; and means for updating selected portions of any of the stored files at one of said first and second computer to correspond to a predetermined portion of the modified portions of the modified files at another of said first and second computer, said updating means including means for selectively updating only predetermined portions of the stored files corresponding to selected modified portions of the modified files.

2. The system as recited in clam 1, further including means for formulating said stored file into one or more predetermined records and fields.

3. The system as recited in claim 2, wherein said updating means includes means for enabling selection of one or more of said predetermined records and fields defining selected fields and selected records which are to be kept consistent between said modified files and said stored files.

4. The system as recited in claim 3, wherein said means for enabling file updates is enabled only if one or more of said selected fields becomes inconsistent.

5. The system as recited in claim 4, wherein said means for updating includes means for only updating said inconsistent fields.

6. The system as recited in claim 1, wherein said second computer is connected to said first computer in one of a plurality of modes of operation.

7. The system as recited in claim 1, wherein said updating means includes means for updating one or more of said stored files if said corresponding files have been modified.

8. The system as recited in claim 1, wherein said updating means includes means for limiting updates to said stored files.

9. The system as recited in claim 4, wherein said file updating enabling means includes means for determining critical file modifications.

10. The system as recited in claim 9, wherein said updating means includes means for limiting updating or said stored files unless a critical file modification is executed.

11. The system as recited in claim 6, wherein one of said plurality of modes of operation includes a partially connected mode.

12. The system as recited in claim 5, further including means for determining the connection quality between said second and said first computer.

13. The system as recited in claim 12, further including means for setting said mode of operation in response to said determining means.

14. The system as recited claim 13, further including means for selecting a connected mode of operation if said connection is better than a predetermined quality.

15. The system as recited in claim 14, wherein said selecting means includes means for selecting a disconnected mode of operation if said connection quality is worse than said predetermined quality.

16. The system as recited in claim 15, wherein said means for selecting a frequency of updating is based on said mode of operation.

17. In a system having a first computer and a second computer capable of transmitting data to and receiving data from said first computer, both of said first and second computers adapted to store one or more files, a method for managing files, the method comprising: receiving at said second computer one or more of said one or more stored files from said first computer;
   modifying said one or more stored files at either of said first and second computers in response to an application consistency request;
   detecting whether said one or more of said stored files stored on said first computer has been modified;
   detecting whether said one or more of stored files stored on said second computer has been modified; and
   updating selected portions of any of the stored files at one of said first and second computer to correspond to a predetermined portion of the modified portions of the modified files at another of said first and second computer,
   such that only predetermined portions of the stored files corresponding to selected modified portions of the modified files are selectively updated.

18. The method as recited in claim 17, further including the step of specifying said stored and said modified file structure as one or more predetermined fields and records.

19. The method as recited in claim 18, further including the step of preventing said updating step unless one or more of said predetermined fields of records of said stored files is inconsistent with the corresponding one or more of said predetermined fields and records of said modified files.

20. The method as recited in claim 17, further including the step of selectively specifying which of said one or more predetermined fields and records is to be kept consistent.

21. The method as recited in claim 17, further including the step of determining the connection quality between said second and said first computer.

22. The method as recited in claim 21, further including the step of setting said mode of operation in response to said determining step.

23. The method as recited in claim 22, further including the step of selecting a connected mode of operation if said connection is better than a predetermined quality.

24. The method as recited in claim 22, further including the step of selecting a disconnected mode of operation it said connection quality is worse than said predetermined quality.

25. The method as recited in claim 22, further including the step of selecting a partially connected mode of operation if said connection quality is of a predetermined quality.

* * * * *